United States Patent [19]
Enomoto et al.

[11] Patent Number: 4,567,018
[45] Date of Patent: Jan. 28, 1986

[54] CORE CONSTRUCTION OF NUCLEAR REACTOR

[75] Inventors: Masaki Enomoto, Mito; Michihiro Ozawa, Hitachi, both of Japan

[73] Assignees: Hitachi, Ltd.; Hitachi Engineering Co., Ltd., both of Tokyo, Japan

[21] Appl. No.: 704,149

[22] Filed: Feb. 22, 1985

Related U.S. Application Data

[63] Continuation of Ser. No. 374,726, May 4, 1982, abandoned.

[30] Foreign Application Priority Data

May 6, 1981 [JP] Japan .................................. 56-66919

[51] Int. Cl.⁴ .............................................. G21C 3/32
[52] U.S. Cl. .................................... 376/435; 376/267; 376/349
[58] Field of Search ........................ 376/267, 349, 435

[56] References Cited

U.S. PATENT DOCUMENTS

| 3,799,839 | 3/1974 | Fisher et al. | 376/349 X |
| 3,892,625 | 7/1975 | Patterson | 376/267 X |
| 3,986,924 | 10/1976 | Motoda et al. | 376/267 X |
| 4,244,784 | 1/1981 | Takeda et al. | 376/435 |
| 4,280,874 | 7/1981 | Kawai et al. | 376/435 X |

FOREIGN PATENT DOCUMENTS

| 2815200 | 11/1978 | Fed. Rep. of Germany | 376/267 |
| 54-35583 | 3/1979 | Japan | 376/267 |
| 54-151788 | 11/1979 | Japan | 376/267 |
| 1126322 | 9/1968 | United Kingdom | 376/267 |

OTHER PUBLICATIONS

Duckworth & Greenwood, Nucl. Energy, Apr. 1981, vol. 20, #2, pp. 136–139.
Chen et al., Optimal Power Profile Fuel Management, Annals of Nuc. Energy, vol. 4, #9/10, 1977, pp. 409–415.

Primary Examiner—Peter A. Nelson
Attorney, Agent, or Firm—Beall Law Offices

[57] ABSTRACT

A core construction of a nuclear reactor wherein the fuel charge in the core has ¼ symmetry and fuel assemblies adjacent a control rod (10) constitute a core unit. In the central portion of the core, each core unit (12) is composed of one thrice burned fuel assembly (3), and three once (1) or twice (2) burned fuel assemblies. One of the two types of fuel assemblies which includes two fuel assemblies located on a diagonal line in the respective core unit. In the core as a whole, the fuel assemblies of the same type or the same burning cyclic period are located on a diagonal line (E,F,G).

27 Claims, 3 Drawing Figures

CORE CONSTRUCTION OF NUCLEAR REACTOR

This application is a continuation of application Ser. No. 374,726, filed May 4, 1982 and now abandoned.

BACKGROUND OF THE INVENTION

This invention relates to core constructions of nuclear reactors, and more particularly it is concerned with a core construction of a nuclear reactor in which four fuel assemblies arranged in a square adjacent a control rod are counted as a core unit and a multiplicity of such core units are arranged to provide the core construction.

It is necessary that the fuel assemblies arranged to provide a core of a nuclear reactor be replaced periodically by new fuel assemblies depending on the operating conditions of the nuclear reactor. The core of a nuclear reactor is usually designed such that ¼ of the total fuel assemblies are replaced by new ones when replacement is carried out periodically. Such core construction is referred to as a four batch replacing core. This type of core construction suffers the disadvantage that since each batch of four fuel assemblies has its fuel assemblies replaced by ¼, it is necessary to shut down the reactor three times before one fuel assembly is burned up.

SUMMARY OF THE INVENTION

Accordingly this invention has as its object the provision of a core construction of a nuclear reactor enabling the reactor to be run with minimized shutdowns and a prolonged period of continuous operation.

The aforesaid object is accomplished according to the invention by adopting a three batch replacing core as a core construction of a nuclear reactor in which ⅓ the total fuel assemblies are replaced by new ones at a time as replacing is carried out periodically, and each core unit arranged in the central portion of the core composed of four fuel assemblies arranged in a square and adjacent a control rod includes one thrice burned fuel assembly and three once or twice burned fuel assemblies.

The three batch replacing core offers the advantage that it has a prolonged continuous operation period as compared with the four batch replacing core because it has a higher rate of new fuel assemblies mounted in the core. However, unlike the four batch replacing core in which each core unit is composed of four fuel assemblies of 1-4 burning cyclic periods, the three batch replacing core is required to form a core unit by four fuel assemblies of 1-3 burning cyclic periods, so that each core unit is composed of three once, twice and thrice burned fuel assemblies and either one of once, twice and thrice burned fuel assemblies. Thus, if the fuel assemblies of different burning cyclic periods are evenly arranged in the three batch replacing core as is the case with the fuel assemblies of the four batch replacing core, some core units would include two thrice burned fuel assemblies in each, and the central portion of the core would contains such core units. We have found that in this core construction the continuous operation period is not so long as it was initially expected because of the fact that burnup of the core units containing two thrice burned fuel assemblies that are arranged in the central portion of the core occurs earlier than expected due to high reactivity in the central portion of the core. To avoid this phenomenon, the invention provides a unique arrangement of fuel assemblies in the core units located in the central portion of the core whereby the core units of the three batch replacing core according to the invention located in the central portion of the core are each composed of one thrice burned fuel assembly and three once or twice burned fuel assemblies. The reasons why the core units located in the outer peripheral portion of the core are excluded from the aforesaid arrangement of fuel assemblies are because the outer peripheral portion of the core is low in reactivity and the existence of a large number of thrice burned fuel assemblies in which burnup has progressed does not bring about a shortening of the continuous operation period and because it is necessary to arrange in the outer peripheral portion of the core a larger number of thrice burned fuel assemblies accounting for ⅓ the total number of fuel assemblies in the core, since the central portion of the core can only contain thrice burned fuel assemblies in a number which is only ¼ the total number of fuel assemblies in the core. The construction incorporating therein the aforesaid arrangement of fuel assemblies has been found to be able to prolong the continuous operation period by about 16% as compared with a four batch replacing core of the prior art.

BRIEF DESCRIPTION OF THE DRAWINGS

FIG. 1 is a horizontal sectional view of a boiling-water type nuclear reactor of an electrical power output of 460 MWe in which the present invention is incorporated;

FIG. 2 is a detailed view of a ¼ core of FIG. 1 shown on an enlarged scale; and

FIG. 3 is a view in explanation of the order in which replacing of fuel assemblies of one core unit is effected.

DESCRIPTION OF THE PREFERRED EMBODIMENT

Figures 1, 2, 3:
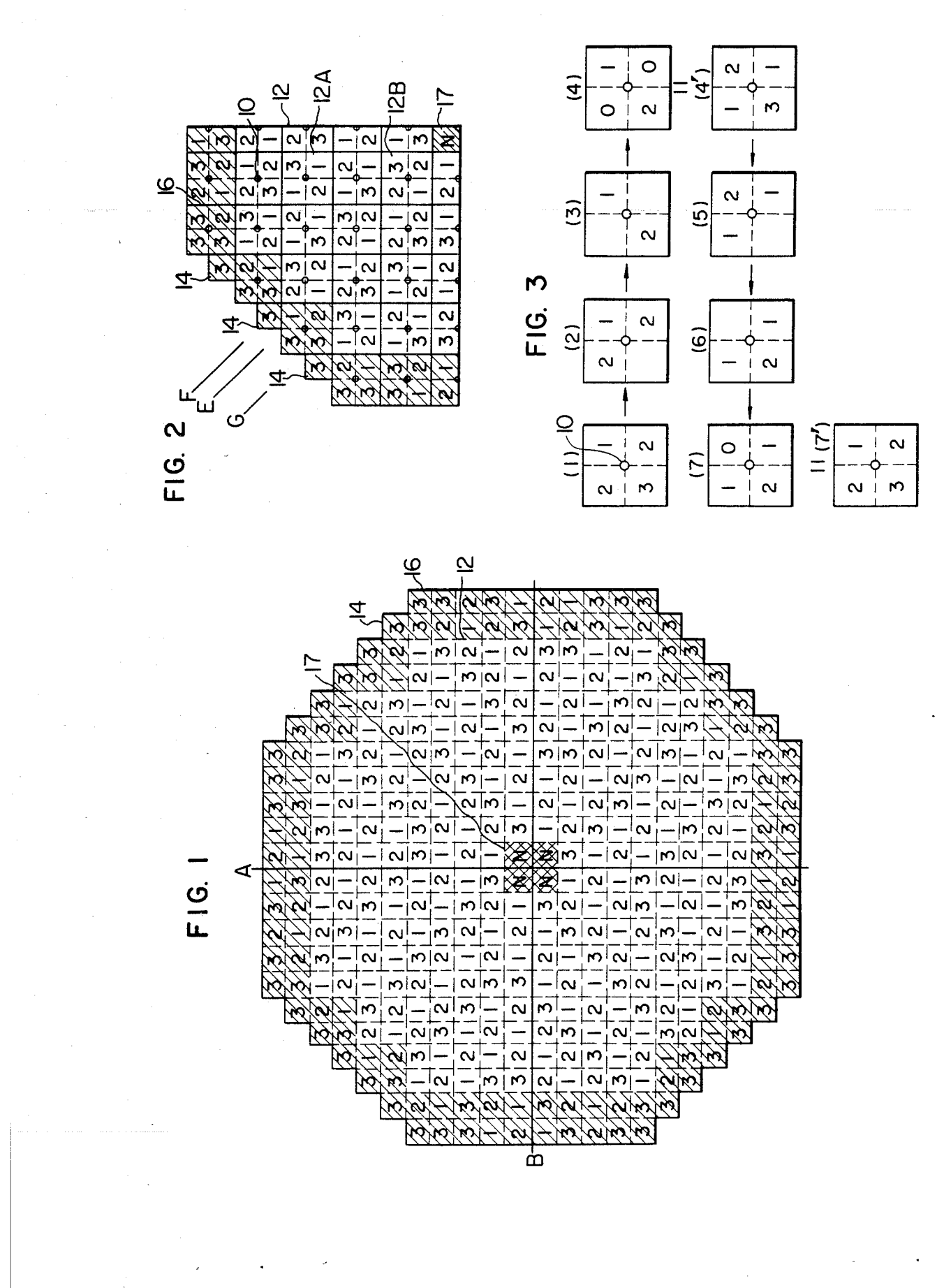

One embodiment of the invention will be described by referring to the accompanying drawings. FIG. 1 is a horizontal sectional view of a boiling-water type nuclear reactor with a thermal output of 1400 MWt in which the core is composed of 400 fuel assemblies and has a height of 144 in. The fuel is a gadolinia containing fuel with a mean enrichment of about 3 wt%. Solid lines A and B divide the core into four ¼ cores each of which constitute a standard. By turning the ¼ core successively through 90 degrees, the whole of the core is provided.

A core unit 12 is a core unit located in other regions than the region which is hatched. More specifically, the core unit 12 is one except for a core unit 17 located in the center of the core, a core unit 16 located in an outer peripheral portion of the core and fuel assemblies 14 not constituting a core unit. The reason why the fuel assemblies located in the center of the core is excluded is because four fuel assemblies of the same burning cyclic period would be grouped together if ¼ symmetry is imparted to them, and the reactor shutdown reserve would diminish unless care is exercised to mount such fuel assemblies as have their reactivity specially reduced. The reason why the core unit located in the outer peripheral portion is excluded is because the core unit located in the outer peripheral portion of the core should contain those fuel assemblies which are left over after inclusion in each core unit located in the central portion of the core as one member of four members of the core unit. In some cases, fuel assemblies of four burning cyclic periods and five burning cyclic periods may be located in the outer peripheral portion of the core.

The fuel assemblies which do not constitute a core unit are excluded for the same reason as the core unit located in the outer peripheral portion of the core is excluded.

FIG. 2 shows in detail the ¼ core in a horizontal sectional view. A core unit is composed of four fuel assemblies surrounding a control rod 10. In the figure, the numerals 1-3 each refer to a burning cyclic period of each fuel assembly that is located in the core. The core unit 12A is composed of two once burned fuel assemblies 1, one twice burned fuel assembly 2 and one thrice burned fuel assembly 3, with the two once burned fuel assemblies 1 being positioned on a diagonal line in the core unit 12A. The core unit 12B is composed of two twice burned fuel assemblies 2, one once burned fuel assembly 1 and one thrice burned fuel assembly 3, with the two twice burned fuel assemblies 2 being positioned on a diagonal line in the core line 12B, like the fuel assemblies 1 in the core unit 12A. The core units 12A and 12B are arranged in the core in such a manner that the once burned fuel assemblies 1 are located on a well-ordered line E and the twice burned fuel assemblies 2 are located on another well-ordered line F while the thrice burned fuel assemblies 3 are located on still another well-ordered line G. These well-ordered lines are arranged such that they are, from upper right, in the order E→F→G→E→F→E→G→F (returning to E). By arranging the core units 12A and 12B in this way, it is possible to obtain even distribution of the burning cyclic periods of the fuel assemblies 1, 2 and 3 in the nuclear reactor.

Table 1 shows the results of operation of the nuclear reactor of the arrangement of fuel assemblies according to the embodiment and the results of operation of the four batch core and three batch core.

TABLE 1

| Core | Enrichment (w/o) | Cycle increment degree of burnup (MWD/MT) | Continuous operation period (FPM)* | Shutdown reserve (% Δk) |
|---|---|---|---|---|
| 4 Batch Core | 2.7 | 6000 | 33.5 | 1.3 |
| 3 Batch Core | 3.0 | 8700 | 36.4 | 1.3 |
| Present invention | 3.0 | 9300 | 38.9 | 1.2 |

*Full Power Month

In the table, it will be seen that in the embodiment of the invention the increment degree of burnup per one operation cycle can be increased to 9300 MWD/MT, with the final degree of burnup of the assemblies reaching 27,900 MWD/MT which is markedly higher than the final degree of burnup of the four batch core of the prior art. Moreover, a drop in reactor shutdown reserve is only 0.1% Δk which does not cause a reduction of the value below the standard value of 1.0% Δk. As for the continuous operation period, the embodiment of the invention has a higher value than the four batch core, with a result that the rated operation period per one operation cycle is greatly increased to 13.0 months from 8.4 months of the prior art. It will be seen that in the embodiment of the invention it is possible to increase the degree of burnup of the fuel assemblies and to prolong the continuous operation period without materially reducing the reactor shutdown reserve.

The following process may be adopted to obtain the aforesaid array of the core units by replacing the fuel assemblies. The process will be described by referring to the core unit shown in FIG. 3(1). First, the thrice burned fuel assembly 3 in the reactor is removed to bring the core unit to a condition shown in FIG. 3(2). Then, the two twice burned assemblies 2 are removed and one of them is arranged in the position previously occupied by the thrice burned fuel assembly 3, as shown in FIG. 3(3). At this time, the position in which the once burned fuel assembly 1 is located is not altered. Finally, new fuel assemblies 0 are arranged in the positions previously occupied by the twice burned fuel assemblies 2, thereby finishing fuel assembly replacing. In the core unit in which fuel assembly replacing is completed, the new fuel assemblies, the once burned fuel assembly and the twice burned fuel assembly correspond to the once burned fuel assemblies, the twice burned fuel assembly and the thrice burned fuel assembly respectively, as shown in FIG. 3(4'). In the next following replacing cycle, one has only to remove the thrice burned fuel assembly 3 (FIG. 3(5)), arrange the twice burned fuel assembly 2 in the position previously occupied by the thrice burned fuel assembly 3 (FIG. 3(6)), and arrange a new fuel assembly 0 (FIG. 3(7)), so as to obtain a core unit shown in FIG. 3(7').

What is claimed is:

1. A core construction of a nuclear reactor in which a multiplicity of core units each having four fuel assemblies disposed in a square pattern adjacent to a control rod are arranged to form a reactor core, wherein said reactor core comprises a central portion thereof in which the core units other than the core unit located at the center of the reactor core each include fuel assemblies of third-burning cyclic periods and fuel assemblies having other burning cyclic periods, said other burning cyclic periods including first-burning cyclic periods and second-burning cyclic periods, said first-, second-, and third-burning cyclic period fuel assemblies having experienced comparative degrees of burn-up proportional to their respective antecedent numbers, said core units other than said core unit located at the center of said reactor core being formed of a first pair of two of said fuel assemblies having the same first one of said other burning cyclic periods arranged along one of two diagonals of said square pattern on opposite sides of said control rod, and a second pair of two fuel assemblies including one of said fuel assemblies of third-burning cyclic periods arranged along the other of said two diagonals on the opposite side of said control rod from a fourth fuel assembly having a second one of said other burning cyclic periods, said second one of said other burning cyclic periods being different from said first one of said other burning cyclic periods.

2. A core construction as claimed in claim 1, wherein said reactor core further comprises an outer peripheral portion formed by core units constituted in a manner different from the core units arranged in said central portion of the reactor core.

3. A core construction as claimed in claim 6, wherein the fuel assemblies positioned in the central portion of the reactor core are arranged whereby the arrangement of fuel assemblies of first, second and third burning cyclic periods in a first one-quarter segment of the reactor core successively turned through ninety degree increments about the center of the reactor core as an axis, is identical to the arrangement of fuel assemblies of first, second and third burning cyclic periods in each one-quarter segment disposed at successive ninety degree increments from said first one-quarter segment.

4. A core construction as claimed in claim 3, wherein each one-quarter segment of the central portion of the reactor core has fuel assemblies of different burning cyclic periods arranged along parallel diagonal lines extending across the segment of the central portion.

5. A core construction as claimed in claim 2, wherein the ratio of the total number of fuel assemblies of said third-burning cyclic periods to the total number of all of the fuel assemblies is lower in the central portion of the reactor core than in the other regions of the reactor core.

6. A core construction of a nuclear reacator in which a multiplicity of core units each having four fuel assemblies disposed in a square pattern adjacent to a control rod are arranged to constitute a reactor core, wherein said reactor core comprises a central portion having four identical one-quarter segments disposed in successive ninety degree increments arranged about the center of the reactor core, with the core units other than the core unit located at the center of the reactor core each composed of fuel assemblies of third-burning cyclic periods and fuel assemblies of other burning cyclic periods, said other burning cyclic periods including first-burning cyclic periods and second-burning cyclic periods, said first-, second-, and third-burning cyclic period fuel assemblies having experienced comparative degrees of burn-up proportional to their respective antecedent numbers, said core units other than said core unit located at the center of said reactor core being formed of a first pair of two of said fuel assemblies of said other burning cyclic periods arranged along the first of two diagonals of said square pattern on opposite sides of said control rod, both of said fuel assemblies in said first pair of fuel assemblies having the same burning cyclic period, and a second pair of two fuel assemblies formed by one of said fuel assemblies of third-burning cyclic periods arranged along the second of said two diagonals with one of said fuel assemblies of said other burning cyclic periods having a burning cyclic period different from the burning cyclic periods of said first pair of fuel assemblies.

7. A core construction as claimed in claim 6, wherein said reactor core further comprises an outer peripheral portion formed by core units constituted of fuel assemblies having said first, second and third burning cyclic periods arranged in a manner different from the core units arranged in said central portion of the reactor core.

8. A core construction of a nuclear reactor in which a multiplicity of core units, each having four fuel assemblies disposed in a square pattern around a location for a control rod, are arranged to form a reactor core, said reactor core comprising:
a first plurality of fuel assemblies having two types of burning cyclic periods, one of said types of said first plurality of fuel assemblies being of first-burning cyclic periods and the other type of said first plurality of fuel assemblies being of second-burning cyclic periods;
a second plurality of fuel assemblies having third-burning cyclic periods;
said first-, second- and third-burning cyclic period fuel assemblies having experienced comparative degrees of burn-up proportional to their respective antecedent numbers;
said first and second pluralities of fuel assemblies being arranged in a multiplicity of core units, each of said core units containing four of said fuel assemblies disposed in a square pattern to encircle a location for a control rod;
said multiplicity of core units forming a central portion of the reactor core; and
the core units located in said central portion at positions other than the center of said central portion each containing a first pair of said fuel assemblies including one of said second plurality of fuel assemblies and a first one of said first plurality of fuel assemblies arranged along one of two diagonals of said square pattern on opposite sides of said location for said control rod, and a second pair of said fuel assemblies including two of said first plurality of fuel assemblies arranged along the other of said two diagonals on opposite sides of said location for said control rod, both of said second pair of fuel assemblies having the same burning cyclic periods, and the burning cyclic periods of said second pair of fuel assemblies being different from the burning cyclic period of said first one of said first plurality of fuel assemblies.

9. A core construction as claimed in claim 8, wherein said reactor core further comprises an outer peripheral portion formed by core units constituted of fuel assemblies of said first and second pluralities arranged in a manner different from the core units arranged in said central portion of the reactor core.

10. A core construction as claimed in claim 8, wherein the fuel assemblies positioned in the central portion of the reactor core are arranged whereby the arrangement of fuel assemblies of first, second and third burning cyclic periods in a first one-quarter segment of the reactor core successively turned through ninety degree increments about the center of the core is identical to the arrangement of fuel assemblies of first, second and third burning cyclic periods in each one-quarter segment disposed at successive ninety degree increments from said first one-quarter segment.

11. A core construction as claimed in claim 9, wherein each one-quarter segment of the central portion of the reactor core has fuel assemblies of different burning cyclic periods arranged along parallel diagonal lines extending across the segment of the central portion.

12. A core construction as claimed in claim 9, wherein the ratio of the total number of fuel assemblies of said third-burning cyclic period to the total number of all of the fuel assemblies is lower in the central portion of the core than in the other regions of the core.

13. A core construction of a nuclear reactor in which a multiplicity of core units each having four fuel assemblies disposed around the location of a control rod along two diagonals intersecting at the location are arranged to form a reactor core, said reactor core comprising:
a plurality of first type fuel assemblies of third-burning cyclic periods;
a plurality of second type fuel assemblies having other burning cyclic periods, said other burning cyclic periods including first-burning cyclic periods and second-burning cyclic periods;
said first-, second- and third-burning cyclic period fuel assemblies having experienced comparative degrees of burn-up proportional to their respective antecedent numbers;

said fuel assemblies being arranged in a multiplicity of core units, each of said core units containing four of said fuel assemblies disposed along two diagonals having a point of intersection at the location for a control rod in a pattern encircling said location;

said multiplicity of core units forming a central portion of the reactor core; and said core units located in said central portion at positions other than the center of said central portion each containing a first pair of fuel assemblies including one of said first type of fuel assemblies and one of said second type of fuel assemblies arranged along one of said two diagonals on opposite sides of said location for said control rod, and a second pair of fuel assemblies including two of said second type of fuel assemblies arranged on opposite sides of said location for said control rod along the other of said diagonals, both of said second pair of fuel assemblies having the same one of said other burning cyclic periods, the burning cyclic periods of said second pair of fuel assemblies being different from the burning cyclic periods of said first pair of fuel assemblies.

14. A core construction as claimed in claim 13, wherein said reactor core further comprises a peripheral portion formed by core units constituted of said first and second types of fuel assemblies arranged in a manner different from the core units arranged in said central portion of the reactor core.

15. A core construction as claimed in claim 13, wherein the fuel assemblies positioned in the central portion of the reactor core are arranged whereby the arrangement of fuel assemblies of first, second and third burning cyclic periods in a first one-quarter segment of the reactor core successively turned through ninety degree increments about the center of the core is identical to the arrangement of fuel assemblies of first, second and third burning cyclic periods in each one-quarter segment disposed at successive ninety degree increments from said first one-quarter segment.

16. A core construction as claimed in claim 15, wherein each one-quarter segment of the central portion of the reactor core has fuel assemblies of different burning cyclic periods arranged along parallel diagonal lines extending across the segment of the central portion.

17. A core construction as claimed in claim 14, wherein the ratio of the number of fuel assemblies of third-burning cyclic periods to the the number of all of the fuel assemblies is lower in the central portion of the core than in the other regions of the core.

18. A core construction as claimed in claim 2, wherein the fuel assemblies positioned in the central portion of the reactor core are arranged whereby the arrangement of fuel assemblies of first, second and third burning cyclic periods in a first one-quarter segment of the reactor core successively turned through ninety degree increments about the center of the reactor core as an axis, is identical to the arrangement of fuel assemblies of first, second and third burning cyclic periods in each one-quarter segment disposed at successive ninety degree increments from said first one-quarter segment.

19. A core construction as claimed in claim 18, wherein each one-quarter segment of the central portion of the reactor core has fuel assemblies of different burning cyclic periods arranged along parallel diagonal lines extending across the segment of the central portion.

20. The core construction of claim 6, wherein each one-quarter segment of the central portion of the reactor core has fuel assemblies of different burning cyclic periods arranged along parallel diagonal lines extending across the segment of the central portion.

21. The core construction of claim 7, wherein the ratio of the total number of fuel assemblies of said third-burning cyclic periods to the total number of all of the fuel assemblies is lower in the central portion of the reactor core than in the other regions of the reactor core.

22. The core construction of claim 7, wherein each one-quarter segment of the central portion of the reactor core has fuel assemblies of different burning cyclic periods arranged along parallel diagonal lines extending across the segment of the central portion.

23. The core construction of claim 10, wherein each one-quarter segment of the central portion of the reactor core has fuel assemblies of different burning cyclic periods arranged along parallel diagonal lines extending across the segment of the central portion.

24. The core construction of claim 12, wherein the fuel assemblies positioned in the central portion of the reactor core are arranged whereby the arrangement of fuel assemblies of first-, second-, and third-burning cyclic periods in a first one-quarter segment of the reactor core successively turned through ninety degree increments about the center of the reactor core as an axis, is identical to the arrangement of fuel assemblies of first-, second- and third-burning cyclic periods in each one-quarter segment disposed at successive ninety degree increments from said first one-quarter segment.

25. The core construction of claim 11, wherein the fuel assemblies positioned in the central portion of the reactor core are arranged whereby the arrangement of fuel assemblies of first-, second-, and third-burning cyclic periods in a first one-quarter segment of the reactor core successively turned through ninety degree increments about the center of the reactor core as an axis, is identical to the arrangement of fuel assemblies of first-, second- and third-burning cyclic periods in each one-quarter segment disposed at successive ninety degree increments from said first one-quarter segment.

26. The core construction of claim 14, wherein the fuel assemblies positioned in the central portion of the reactor core are arranged whereby the arrangement of fuel assemblies of first-, second-, and third-burning cyclic periods in a first one-quarter segment of the reactor core successively turned through ninety degree increments about the center of the reactor core as an axis, is identical to the arrangement of fuel assemblies of first-, second- and third-burning cyclic periods in each one-quarter segment disposed at successive ninety degree increments from said first one-quarter segment.

27. The core construction of claim 26, wherein each one-quarter segment of the central portion of the reactor core has fuel assemblies of different burning cyclic periods arranged along parallel diagonal lines extending across the segment of the central portion.

* * * * *